US006909598B2

United States Patent
Cheng et al.

(10) Patent No.: US 6,909,598 B2
(45) Date of Patent: Jun. 21, 2005

(54) COMPUTER DEVICE CONFIGURED FOR USE IN DIFFERENT MODES

(75) Inventors: Sheng-Hsiung Cheng, Taipei Hsien (TW); Cheng Tu, Taipei Hsien (TW); Pe-Hu Lan, Taipei Hsien (TW); Chun-Chang Lai, Taipei Hsien (TW); Chih-Hsiung Chen, Taipei Hsien (TW)

(73) Assignee: Aopen Inc., Hsichin (TW)

( * ) Notice: Subject to any disclaimer, the term of this patent is extended or adjusted under 35 U.S.C. 154(b) by 12 days.

(21) Appl. No.: 10/745,766

(22) Filed: Dec. 23, 2003

(65) Prior Publication Data

US 2005/0068718 A1 Mar. 31, 2005

(30) Foreign Application Priority Data

Sep. 25, 2003 (TW) ........................................ 92126537 A (51) Int. Cl.[7] .................................................. G06F 1/16
(52) U.S. Cl. ................. 361/683; 248/176.1; 312/208.4; 345/905
(58) Field of Search ................................ 361/679–687, 361/724–727; 345/168–169, 905; 248/176.1, 917–924; 312/208.1, 208.4; 364/708.1

(56) References Cited

U.S. PATENT DOCUMENTS 6,256,193 B1 * 7/2001 Janik et al. ................. 361/683
6,275,376 B1 * 8/2001 Moon .......................... 361/683
2005/0040298 A1 * 2/2005 Ohki et al. ............... 248/176.1

* cited by examiner

Primary Examiner—Hung Van Duong
(74) Attorney, Agent, or Firm—Townsend and Townsend and Crew LLP (57) ABSTRACT

In a computer device, a main housing has a mounting wall formed with a set of first mounting members. A base plate is formed with a set of second mounting members. A support unit includes a mounting plate formed with a set of third mounting members for engaging detachably and respectively one of the set of the first mounting members of the mounting wall of the main housing and the set of the second mounting members of the base plate, and a hinge device interconnecting the mounting plate and a supporting plate such that the supporting plate is pivotable relative to the mounting plate. A display unit is mounted detachably on the supporting plate of the support unit.

13 Claims, 7 Drawing Sheets

COMPUTER DEVICE CONFIGURED FOR USE IN DIFFERENT MODES

CROSS-REFERENCE TO RELATED APPLICATION

This application claims priority of Taiwanese Application No. 092126537, filed on Sep. 5, 2003.

BACKGROUND OF THE INVENTION

1. Field of the Invention

The invention relates to a computer device, more particularly to a computer device configured for use in different modes.

2. Description of the Related Art

In a conventional desktop computer, which includes a main housing, and a liquid crystal display disposed spacedly apart from the main housing, there is no variance in assembly. Therefore, the conventional desktop computer cannot meet different user requirements in assembly.

SUMMARY OF THE INVENTION

Therefore, the object of the present invention is to provide a computer device that can be configured for use in different modes.

According to one aspect of the present invention, a computer device comprises:

a main housing having a mounting wall formed with a set of first mounting members;

a base plate formed with a set of second mounting members;

a support unit including a mounting plate formed with a set of third mounting members for engaging detachably and respectively one of the set of the first mounting members of the mounting wall of the main housing and the set of the second mounting members of the base plate, a supporting plate, and a hinge device interconnecting the mounting plate and the supporting plate such that the supporting plate is pivotable relative to the mounting plate; and a display unit mounted detachably on the supporting plate of the support unit.

According to another aspect of the present invention, a computer device comprises:

a main housing having a mounting wall formed with a set of first mounting members;

a support unit including amounting plate formed with a set of second mounting members for engaging detachably and respectively the set of the first mounting members of the mounting wall of the main housing, a supporting plate, and a hinge device interconnecting the mounting plate and the supporting plate such that the supporting plate is pivotable relative to the mounting plate; and a display unit mounted detachably on the supporting plate of the support unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
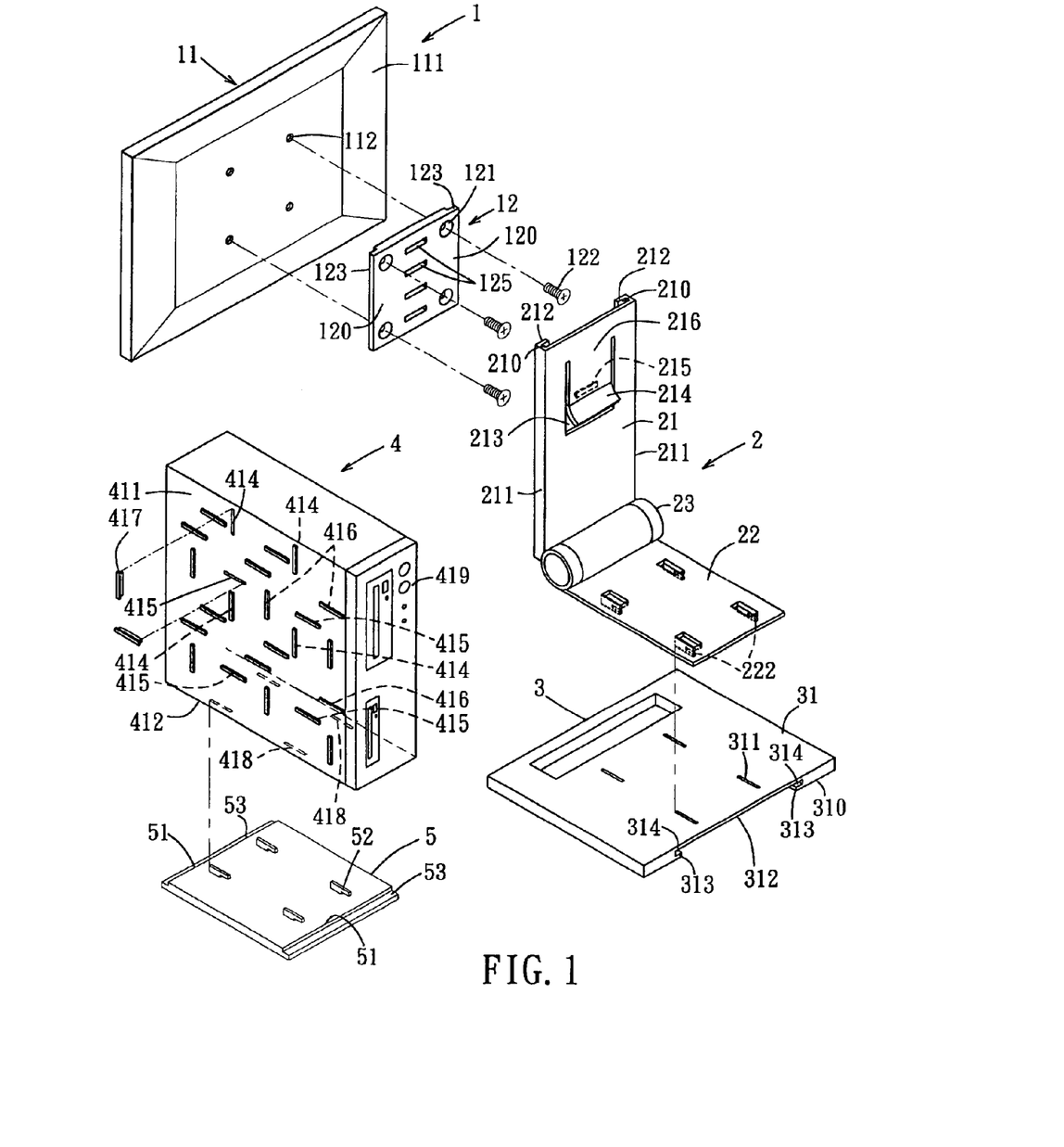
FIG. 1 is an exploded perspective view showing the preferred embodiment of a computer device according to the present invention.

Referring to FIG. 1, the preferred embodiment of a computer device according to the present invention is shown to include a main housing 4, a base plate 3, a support unit 2, a display unit 1, and a coupling plate 5.

The main housing 4 has a mounting wall 411 formed with two sets of first mounting members 414, 415, such as slots. In this embodiment, the main housing 4, which is rectangular, further has a connecting wall 412 connected to and transverse to the mounting wall 411, and an operating wall 419 connected to and transverse to the mounting wall 411 and the connecting wall 412. The connecting wall 412 is formed with a set of engaging members 418, such as slots. The mounting wall 411 is further formed with a plurality of insert holes 416. A plurality of colored mounting pieces 417 can be mounted respectively in selected ones of the first mounting members 414, 415 and the insert holes 416 for decorative purposes. In this embodiment, the connecting wall 412 has a size smaller than that of the mounting wall 411.

The base plate 3 is formed with a set of second mounting members 311, such as slots. In this embodiment, the base plate 3 has a coupling surface 310 formed with a receiving groove 312 that has opposite lateral walls 313, each of which is formed with a coupling groove 314.

The support unit 2 includes a mounting plate 22 formed with a set of third mounting members 222, such as lugs formed by punching, for engaging detachably and respectively one of the sets of the first mounting members 414, 415 of the mounting wall 411 of the main housing 4 and the set of the second mounting members 311 of the base plate 3, a supporting plate 21, and a known hinge device 23 interconnecting the mounting plate 22 and the supporting plate 21 such that the supporting plate 21 is pivotable relative to the mounting plate 22. In this embodiment, the supporting plate 21 has opposite lateral ends 211 and is formed with opposite extension flanges 212 that extend frontwardly, inwardly and respectively from the lateral ends 211 so as to confine opposite engaging grooves 210. The supporting plate 21 is provided with a resilient positioning tab 214 formed with a positioning rib 215. The supporting plate 21 is further formed with a rectangular cut-out 213. The positioning tab 214 is disposed in the cut-out 213, and has one edge 216 connected hingeably to a periphery of the cut-out 213.

Figure 2:
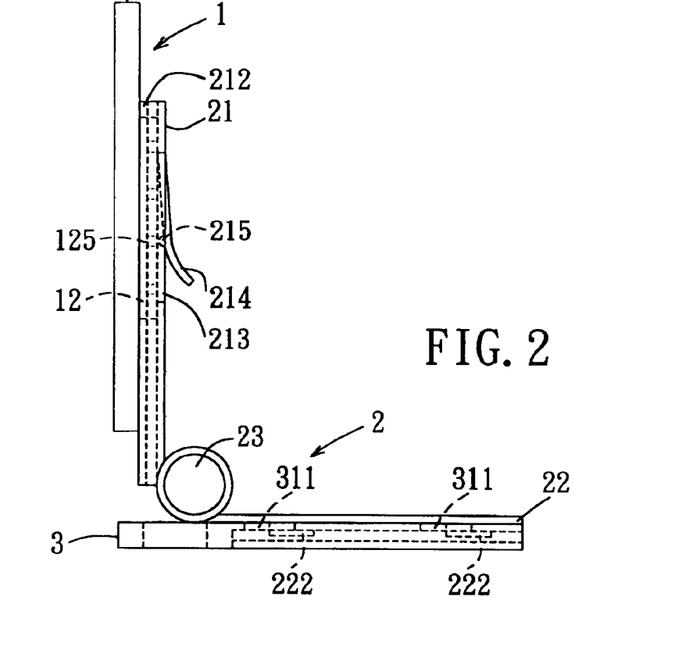
FIG. 2 is a schematic side view showing a display unit, a support unit and a base plate of the preferred embodiment when used in a first mode.
Figure 3:
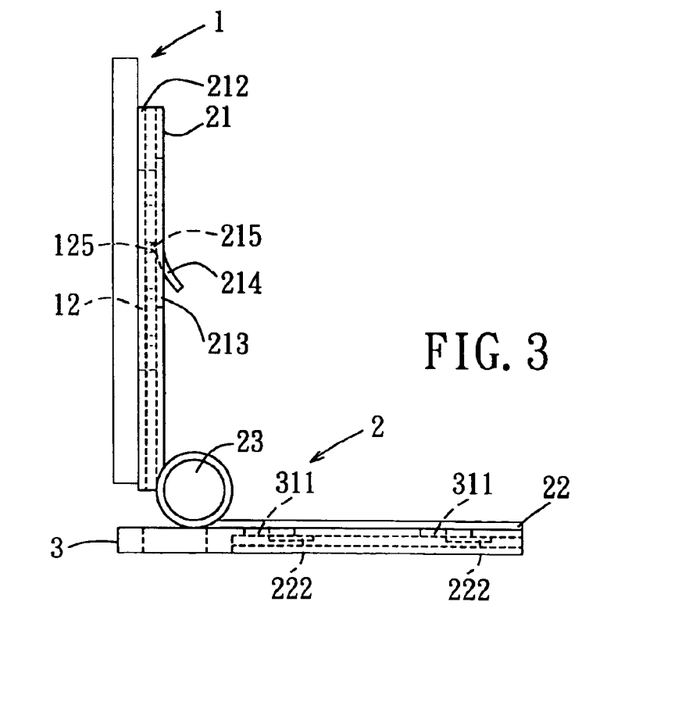
FIG. 3 is a schematic side view showing the display unit positioned at a desired height when the preferred embodiment is used in the first mode.

The display unit 1 is mounted detachably on the supporting plate 21 of the support unit 2. In this embodiment, the display unit 1 includes a liquid crystal display (LCD) panel 11 that has a rear side 111, and a coupling block 12 that is fastened detachably on the rear side 111 of the LCD panel 11 by means of a plurality of screw fasteners 122 extending through a plurality of through holes 121 in the coupling block 12 and threaded in a plurality of screw holes 112 in the rear side 111 of the LCD panel 11. The coupling block 12 has opposite lateral sides 120, each of which is formed with an engaging flange 123. The engaging flanges 123 engage detachably, slidably and respectively the engaging grooves 210 in the supporting plate 21, as shown in FIG. 2. The coupling block 12 is formed with a plurality of parallel positioning slots 125. The positioning rib 215 on the positioning tab 214 engages a selected one of the positioning slots 125 in the coupling block 12 such that the display unit 1 is positioned at a desired height, as shown in FIG. 3.

Figure 5:
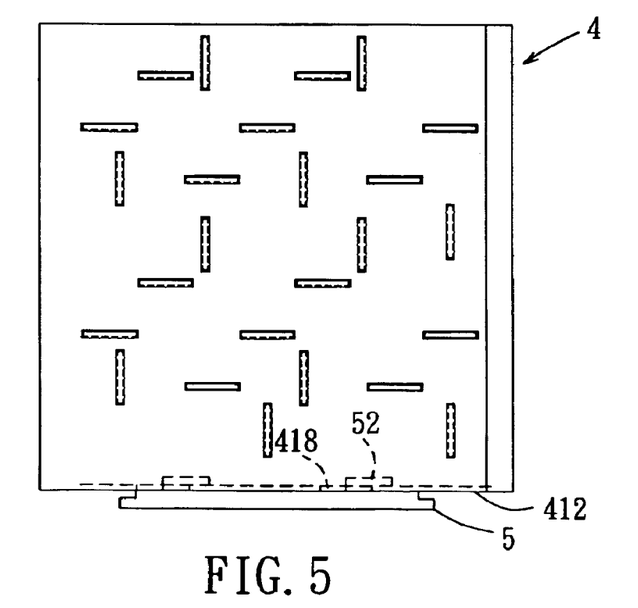
FIG. 5 is a schematic view showing a main housing of the preferred embodiment when used in the first mode.

The coupling plate 5 is formed with a set of second engaging members 52, such as lugs, that engage detachably and respectively the first engaging members 418 of the connecting wall 412 of the main housing 4, as shown in FIG. 5. In this embodiment, the coupling plate 5 has opposite ends 51, each of which is formed with a coupling flange 53. It is noted that the base plate 3 has a size larger than that of the coupling plate 5. As such, the coupling plate 5 can be received removably in the receiving groove 312 in the base plate 3, and the coupling flanges 53 on the coupling plate 5 can engage slidably, detachably and respectively the coupling grooves 314 in the lateral walls 313 of the base plate 3, as shown in FIGS. 8 and 9.

Figure 4:
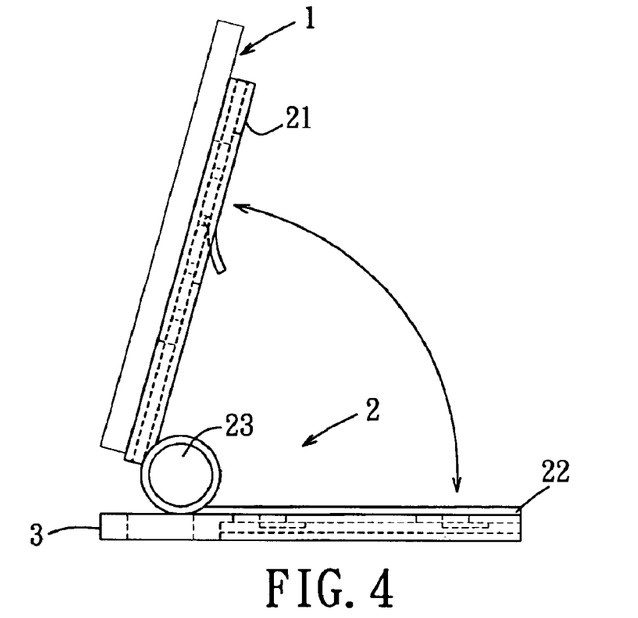
FIG. 4 is a schematic side view to show that the display unit is pivotable relative to the base plate when the preferred embodiment is used in the first mode.
Figure 6:
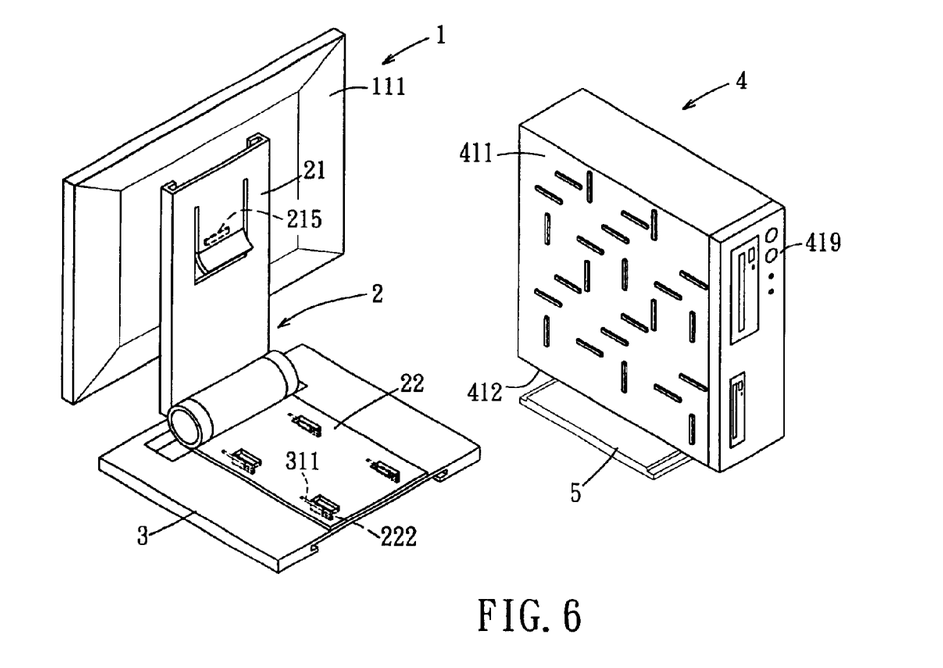
FIG. 6 is a perspective view showing the preferred embodiment when used in the first mode.
Figure 7:
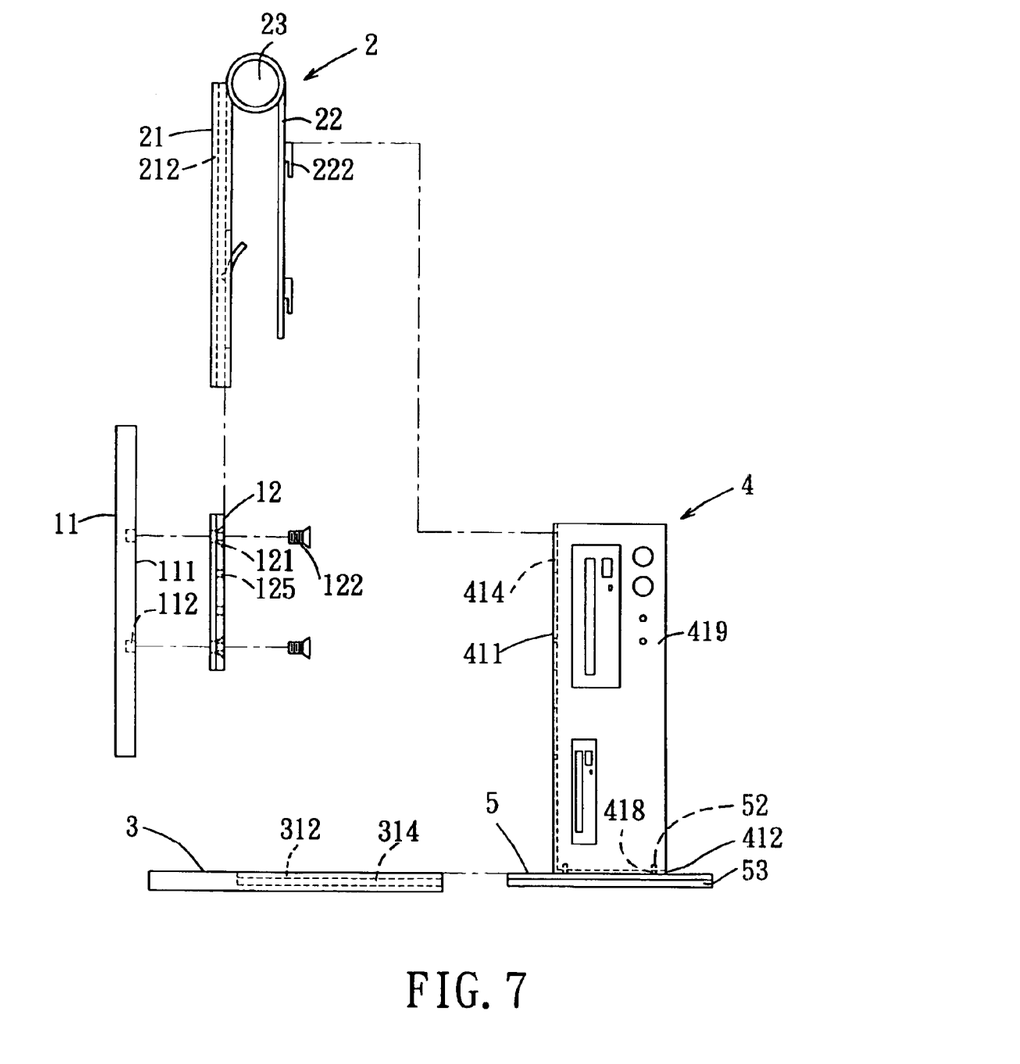
FIG. 7 is an exploded, schematic side view showing the preferred embodiment when used in a second mode.
Figure 8:
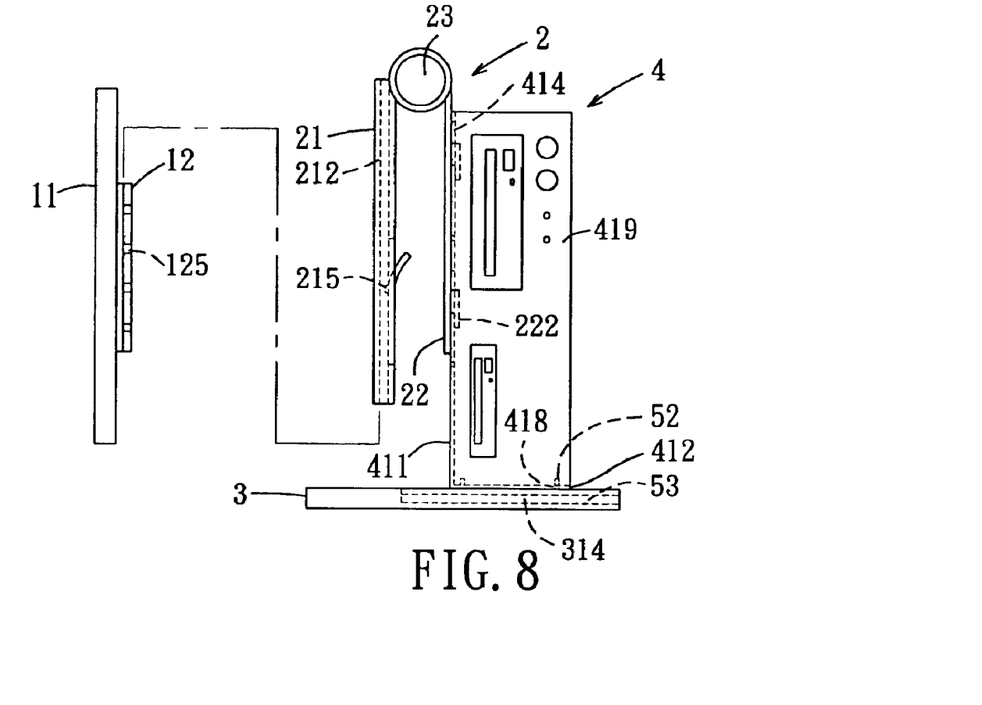
FIG. 8 is a partly exploded, schematic side view showing the preferred embodiment when used in the second mode.
Figure 9:
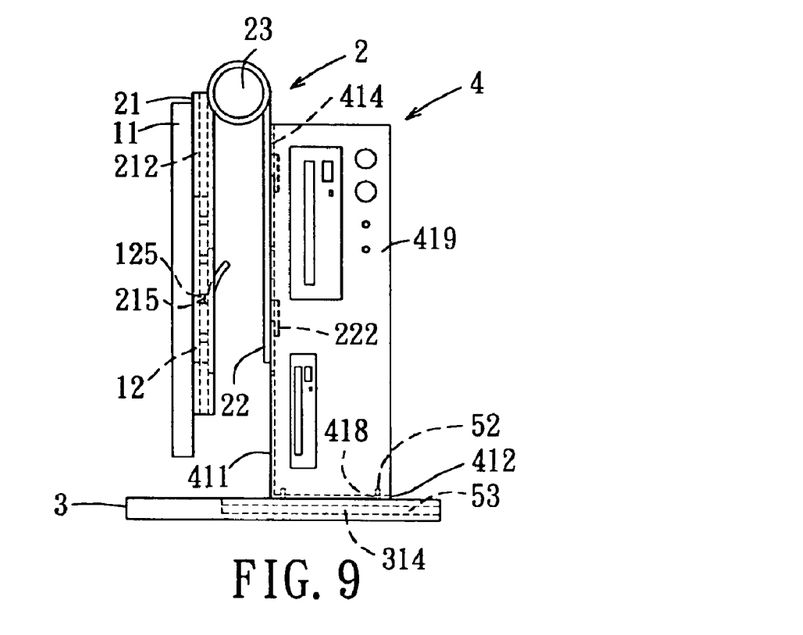
FIG. 9 is a schematic side view showing the preferred embodiment when used in the second mode.
Figure 10:
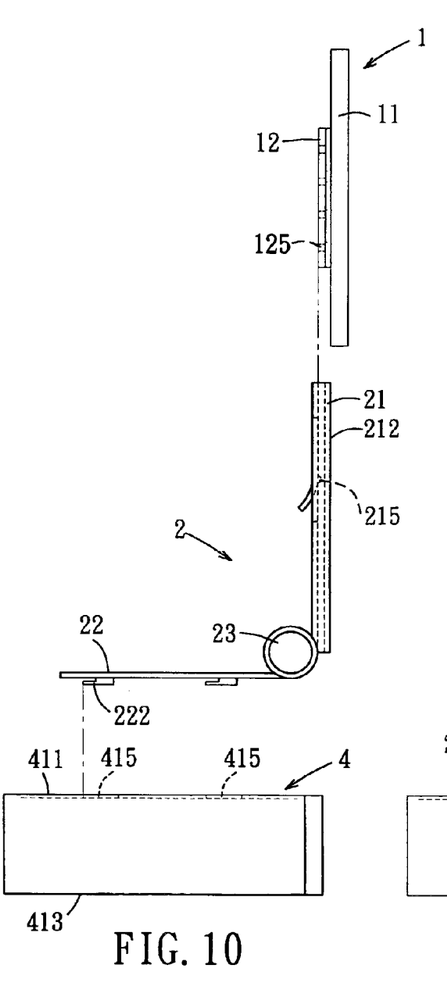
FIG. 10 is an exploded, schematic side view showing the preferred embodiment when used in a third mode.
Figure 11:
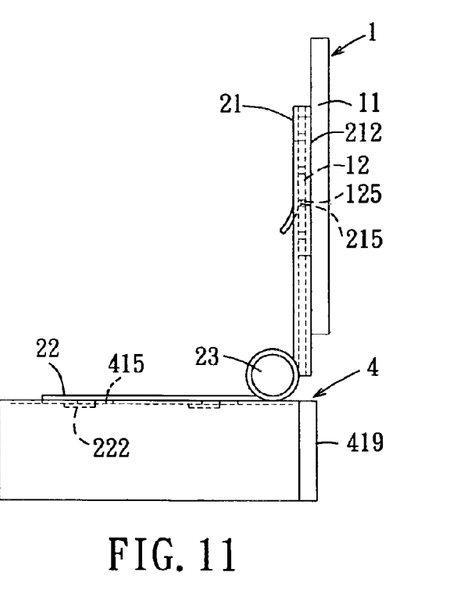
FIG. 11 is a schematic view showing the preferred embodiment when used in the third mode.

In actual use, the computer device of the present invention can be used in one of a first mode, as shown in FIG. 6, where the second engaging members 52 of the coupling plate 5 engage detachably and respectively the first engaging members 418 of the connecting wall 412 of the main housing 4 such that the main housing 4 is mounted on the coupling plate 5 and where the third mounting members 222 of the mounting plate 22 of the support unit 2 engage detachably and respectively the second mounting members 311 of the base plate 3 such that the display unit 1 is pivotable relative to the base plate 3 (see FIG. 4), a second mode, as shown in FIGS. 7 to 9, where the coupling plate 5 mounted with the main housing 4 is received removably in the receiving groove 312 in the base plate 3 and where the third mounting members 222 of the mounting plate 22 of the support unit 2 engage detachably and respectively the first mounting members 414 of the mounting wall 411 of the main housing 4 (in this mode, the mounting wall 411 of the main housing 4 is disposed vertically) such that the display unit 1 is pivotable relative to the main housing 4, and a third mode, as shown in FIGS. 10 and 11, which is similar to the second mode except that the mounting wall 411 of the main housing 4 is disposed horizontally and that the base plate 3 and the coupling plate 5 are not in use.

Therefore, the computer device of the present invention can be used in one of the first to third modes to meet the actual user requirements.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A computer device comprising:
   a main housing having a mounting wall formed with a set of first mounting members;
   a base plate formed with a set of second mounting members;
   a support unit including a mounting plate formed with a set of third mounting members for engaging detachably and respectively one of said set of said first mounting members of said mounting wall of said main housing and said set of said second mounting members of said base plate, a supporting plate, and a hinge device interconnecting said mounting plate and said supporting plate such that said supporting plate is pivotable relative to said mounting plate; and
   a display unit mounted detachably on said supporting plate of said support unit.

2. The computer device as claimed in claim 1, wherein said first and second mounting members are slots, and said third mounting members are lugs.

3. The computer device as claimed in claim 1, wherein said supporting plate has opposite lateral ends and is formed with opposite extension flanges that extend respectively from said lateral ends so as to confine opposite engaging grooves,
   said display unit including a liquid crystal display panel that has a rear side, and a coupling block mounted on said rear side of said liquid crystal display panel, said coupling block having opposite lateral sides, each of which is formed with an engaging flange, said engaging flanges engaging detachably, slidably and respectively said engaging grooves in said supporting plate.

4. The computer device as claimed in claim 1, wherein said main housing further has a connecting wall connected to said mounting wall and formed with a set of first engaging members, said computer device further comprising a coupling plate formed with a set of second engaging members that engage detachably and respectively said first engaging members of said connecting wall of said main housing.

5. The computer device as claimed in claim 3, wherein said supporting plate is provided with a resilient positioning tab formed with a positioning rib, said coupling block being formed with a plurality of parallel positioning slots, said positioning rib engaging a selected one of said positioning slots in said coupling block.

6. The computer device as claimed in claim 3, wherein said coupling block is fastened detachably on said rear side of said liquid crystal display panel.

7. The computer device as claimed in claim 3, wherein said display unit further includes a plurality of screw fasteners that fasten said coupling block to said liquid crystal display panel.

8. The computer device as claimed in claim 4, wherein said first engaging members are slots, and said second engaging members are lugs.

9. The computer device as claimed in claim 4, wherein said coupling plate has opposite ends, each of which is formed with a coupling flange,
   said base plate having a coupling surface formed with a receiving groove that has opposite lateral walls, each of which is formed with a coupling groove,
   said coupling plate being received removably in said receiving groove in said base plate, and said coupling flanges on said coupling plate engaging slidably, detachably and respectively said coupling grooves in said lateral walls of said base plate when said third mounting members of said mounting plate of said support unit engage detachably and respectively said first mounting members of said mounting wall of said main housing.

10. The computer device as claimed in claim 4, wherein said connecting wall has a size smaller than that of said mounting wall.

11. The computer device as claimed in claim 4, wherein said base plate has a size larger than that of said coupling plate.

12. The computer device as claimed in claim 5, wherein said supporting plate is formed with a rectangular cut-out, said positioning tab being disposed in said cut-out and having one edge connected hingeably to a periphery of said cut-out.

13. A computer device comprising:
- a main housing having a mounting wall formed with a set of first mounting members;
- a support unit including a mounting plate formed with a set of second mounting members for engaging detachably and respectively said set of said first mounting members of said mounting wall of said main housing, a supporting plate, and a hinge device interconnecting said mounting plate and said supporting plate such that said supporting plate is pivotable relative to said mounting plate; and
- a display unit mounted detachably on said supporting plate of said support unit.

* * * * *